US008363658B1

(12) United States Patent
Delker et al.

(10) Patent No.: US 8,363,658 B1
(45) Date of Patent: Jan. 29, 2013

(54) DYNAMIC FIREWALL AND DYNAMIC HOST CONFIGURATION PROTOCOL CONFIGURATION

(75) Inventors: Jason R. Delker, Olathe, KS (US); John M. Everson, Leawood, KS (US); James W. Norris, Kansas City, MO (US); Carol A. Ross, Shawnee, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 934 days.

(21) Appl. No.: 12/270,537

(22) Filed: Nov. 13, 2008

(51) Int. Cl.
*H04L 12/26* (2006.01)

(52) U.S. Cl. ....... 370/395.53; 726/11; 726/15; 370/392; 370/389; 370/252

(58) Field of Classification Search ............... 726/11, 726/15; 370/252, 389, 392, 395.53
See application file for complete search history.

(56) References Cited

U.S. PATENT DOCUMENTS

| | | | |
|---|---|---|---|
| 6,088,801 A | | 7/2000 | Grecsek |
| 6,539,388 B1 | | 3/2003 | Hattori et al. |
| 7,606,232 B1* | | 10/2009 | Ruben et al. ............... 370/392 |
| 7,684,438 B2 | | 3/2010 | Stephens et al. |
| 7,698,394 B2 | | 4/2010 | Helmerich |
| 8,032,942 B2 | | 10/2011 | Smith et al. |
| 8,059,641 B1* | | 11/2011 | Rai .............................. 370/389 |
| 2002/0009078 A1* | | 1/2002 | Wilson et al. ............... 370/389 |
| 2002/0112052 A1 | | 8/2002 | Brittingham et al. |
| 2003/0084165 A1 | | 5/2003 | Kjellberg et al. |
| 2003/0217148 A1 | | 11/2003 | Mullen et al. |
| 2004/0218538 A1* | | 11/2004 | Wiedeman et al. .......... 370/241 |
| 2005/0165953 A1 | | 7/2005 | Oba et al. |
| 2005/0210241 A1 | | 9/2005 | Lee et al. |
| 2006/0168648 A1 | | 7/2006 | Vank et al. |
| 2006/0206933 A1* | | 9/2006 | Molen et al. .................. 726/14 |
| 2006/0250979 A1* | | 11/2006 | Gauweiler et al. ........... 370/254 |
| 2006/0259624 A1* | | 11/2006 | Hu et al. ...................... 709/226 |
| 2006/0268749 A1* | | 11/2006 | Rahman et al. .............. 370/256 |
| 2006/0274744 A1* | | 12/2006 | Nagai et al. .................. 370/389 |
| 2006/0274774 A1 | | 12/2006 | Srinivasan et al. |
| 2007/0250833 A1 | | 10/2007 | Araujo, Jr. et al. |
| 2007/0266432 A1* | | 11/2007 | Hara et al. .................... 726/15 |
| 2008/0172492 A1 | | 7/2008 | Raghunath et al. |
| 2008/0198858 A1* | | 8/2008 | Townsley et al. ............ 370/401 |

(Continued)

OTHER PUBLICATIONS

Delker, Jason R., et al., Patent Application entitled, "Dynamic Network Policies Based on Device Classification," filed Nov. 13, 2008, U.S. Appl. No. 12/270,554.

(Continued)

*Primary Examiner* — Jeffrey D Popham
*Assistant Examiner* — Gary Gracia

(57) ABSTRACT

A system is provided comprising a computer system, a configuration database, and a dynamic network interfaces application that receives a message from a network access component containing a request to authenticate a client device accessing a network service, determines that a policy requires the client device to be associated with a virtual local area network to access the network service, and authenticates the client device for association with the virtual local area network. The dynamic network interfaces application also searches the configuration database for configuration information to provision the virtual local area network, assigns the configuration information to the client device, the network access component, and a firewall component, and sends a reply containing the configuration information to the network access component and the firewall component in response to the request, wherein the configuration information comprises settings to provision the virtual local area network.

20 Claims, 6 Drawing Sheets

U.S. PATENT DOCUMENTS

| | | | |
|---|---|---|---|
| 2008/0270606 A1* | 10/2008 | Gooch et al. | 709/225 |
| 2008/0285557 A1* | 11/2008 | Zheng et al. | 370/389 |
| 2008/0320585 A1* | 12/2008 | Ansari et al. | 726/13 |
| 2009/0006585 A1* | 1/2009 | Chen | 709/220 |
| 2009/0178119 A1 | 7/2009 | Macauley | |
| 2009/0199285 A1 | 8/2009 | Agarwal et al. | |
| 2009/0219834 A1* | 9/2009 | Babbar et al. | 370/254 |
| 2009/0268737 A1* | 10/2009 | Giles et al. | 370/392 |
| 2009/0304007 A1* | 12/2009 | Tanaka et al. | 370/395.53 |
| 2010/0071024 A1 | 3/2010 | Eyada | |
| 2010/0080238 A1* | 4/2010 | Allan et al. | 370/401 |
| 2010/0238813 A1* | 9/2010 | Allan et al. | 370/252 |
| 2011/0004913 A1* | 1/2011 | Nagarajan et al. | 726/1 |
| 2011/0103259 A1 | 5/2011 | Aybay et al. | |
| 2012/0131573 A1 | 5/2012 | Dasari et al. | |
| 2012/0134291 A1 | 5/2012 | Raleigh | |

OTHER PUBLICATIONS

Delker, Jason R., et al., Patent Application entitled, "Network Assignment Appeal Architecture and Process," filed Nov. 13, 2008, U.S. Appl. No. 12/270,568.

First Action Interview Pre-Interview Communication dated May 1, 2012, U.S. Appl. No. 12/270,568, filed Nov. 13, 2008.

First Action Interview Pre-Interview Communication dated Jun. 13, 2012, U.S. Appl. No. 12/270,554, filed Nov. 13, 2008.

First Action Interview Office Action dated Jun. 13, 2012, U.S. Appl. No. 12/270,568, filed Nov. 13, 2008.

Notice of Allowance dated Aug. 16, 2012, U.S. Appl. No. 12/270,554, filed Nov. 13, 2008.

Final Office Action dated Aug. 14, 2012, U.S. Appl. No. 12/270,568, filed Nov. 13, 2008.

* cited by examiner

FIG. 5
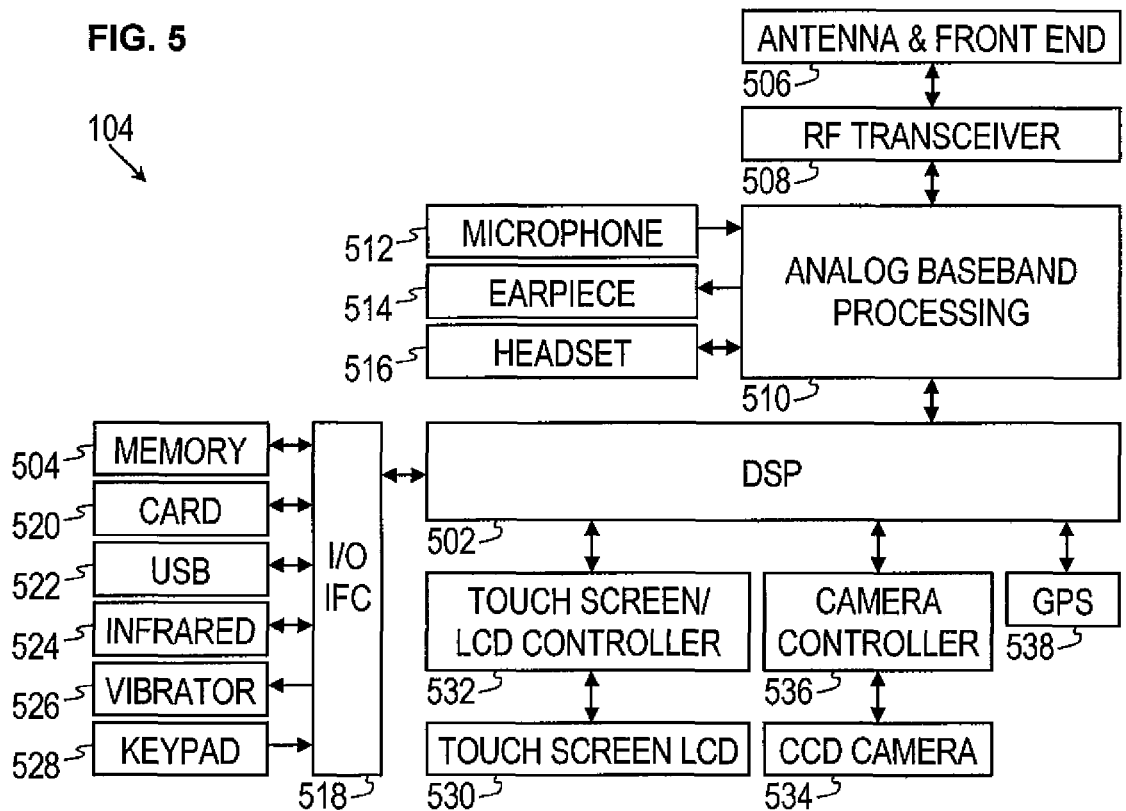
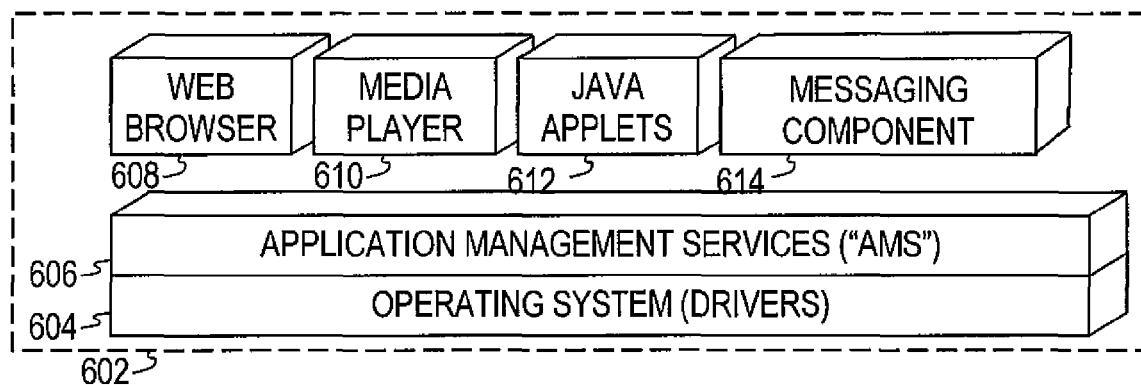
FIG. 6

DYNAMIC FIREWALL AND DYNAMIC HOST CONFIGURATION PROTOCOL CONFIGURATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprise networks traditionally require access devices and network gateway devices to be aware of valid statically-configured virtual local area network definitions as well as their associated network settings. A device with an interface on a virtual local area network may be configured with an identifier for the virtual local area network and a valid internet protocol stack including internet protocol address, subnet mask, and gateway address. Virtual local area network designations may be created in advance and remain statically configured. Network policies are also associated with static virtual local area network designations. Combinations of virtual local area network identifiers or tags with network interfaces traditionally remain static and are well known to devices in a network. Network devices such as access points, switches, and firewalls generally support a limited quantity of physical interfaces. The traditional need for virtual local area networks to be formally designated and have accompanying network interfaces statically configured on network access devices and gateway devices consumes resources, presents potential security concerns, and involves continuing management duties.

SUMMARY

In an embodiment, a dynamic network interfaces system is provided. The system comprises an at least one computer system, a configuration database, and a dynamic network interfaces application that, when executed on the at least one computer system, receives a message from a network access component containing a request to authenticate a client device accessing a network service, determines that a policy requires the client device to be associated with a virtual local area network to access the network service, and authenticates the client device for association with the virtual local area network. The dynamic network interfaces application also searches the configuration database for configuration information to provision the virtual local area network, assigns the configuration information to the client device, the network access component, and a firewall component, and sends a reply containing the configuration information to the network access component and the firewall component in response to the request, wherein the configuration information comprises settings to provision the virtual local area network.

In another embodiment, a method of dynamically provisioning a virtual local area network is provided. The method comprises receiving a message from an access device containing a request to authenticate a client device accessing a network service, determining that a policy requires the client device to be associated with a virtual local area network to access the network service, and obtaining a virtual local area network tag and a subnet interface information from resource pools in a configuration database. The method also comprises creating messages comprising the virtual local area network tag, the subnet interface information, the policy, the physical interface designations, and a plurality of instructions to configure a subnet interface using the information and associate the subnet interface with the designated physical interfaces on the access device and the firewall device to provision the virtual local area network. The method also comprises sending the messages to the access device and the firewall device using a messaging framework associated with one of a dynamic host configuration protocol and a simple network management protocol and receiving messaging from the access device and the firewall device indicating that the subnet interface has been configured on the access device and the firewall device as directed in the messages received.

In another embodiment, a method of dynamically provisioning a virtual local area network is provided. The method comprises receiving a message from an access device comprising a request to authenticate a client device accessing a network service, determining that a policy requires the client device to be associated with a virtual local area network to access the network service, and determining that the client device is a member of a group wherein members of the group are associated with a single virtual local area network tag. The method also comprises determining that the client device is one of the first member of the group to request access and one of the second and subsequent members of the group to request access to the network service and receive authentication. The method also comprises generating subnet interface information and the virtual local area network tag and sending the subnet interface information and the virtual local area network tag with the policy and physical interface designations to the access device and a firewall device for virtual local area network provisioning when the client device is the first member of the group to request access to the network service associated with the group. The method also comprises joining the client device to the existing virtual local area network designated for the group when the client device is one of the second and subsequent members of the group to request access to the network service associated with the group.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is a block diagram of a mobile device according to an embodiment of the disclosure.

FIG. 6 is a block diagram of a software configuration for a mobile device according to an embodiment of the disclosure.

DETAILED DESCRIPTION

Figure 1:
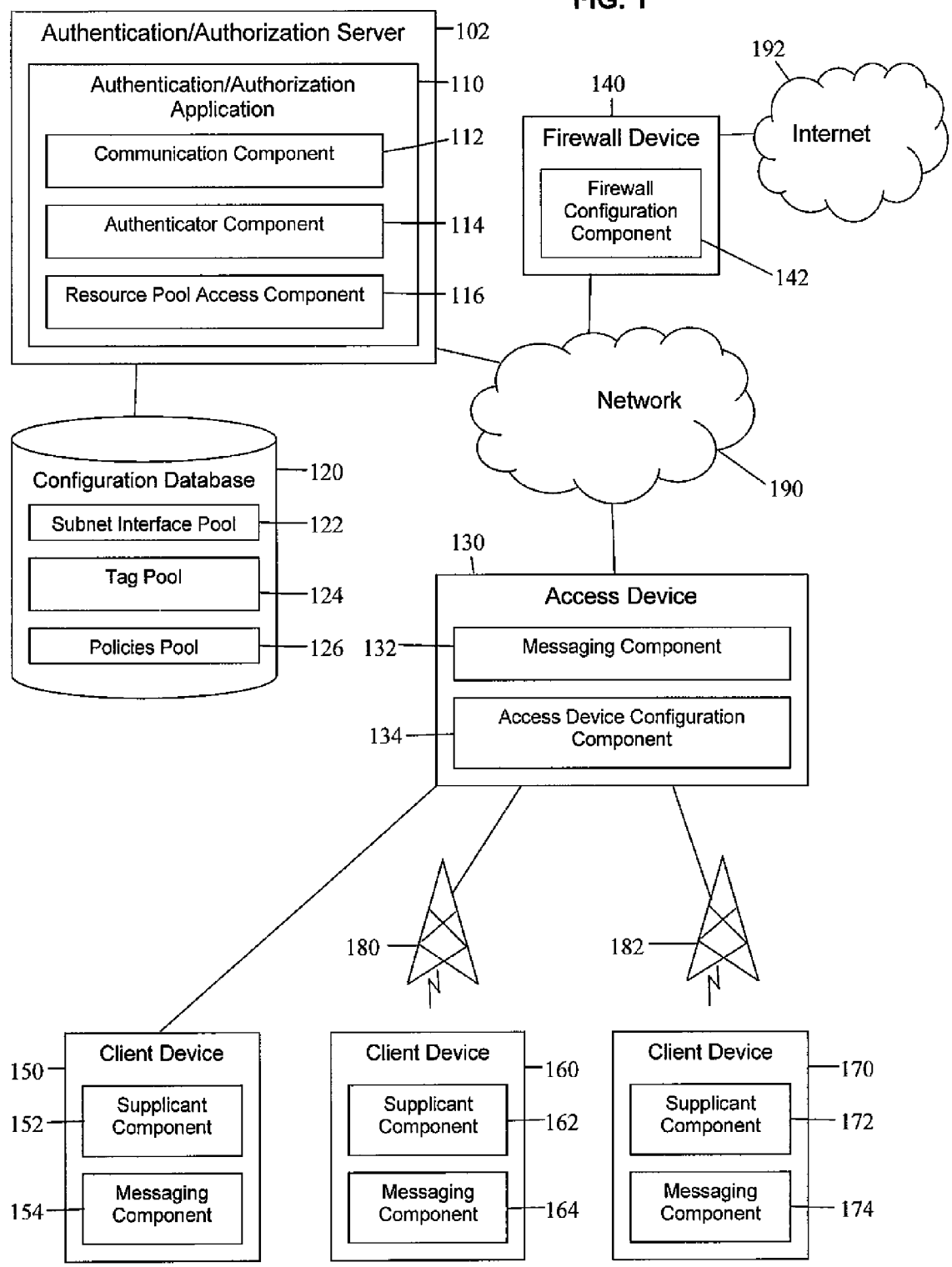
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a system for dynamic firewall and dynamic host configuration protocol (DHCP) configuration permit virtual local area networks (VLANs) to be created dynamically and on demand. The dynamic character of the virtual local area networks' provisioning alleviates the need for maintaining and managing static combinations of subnet interface and virtual local area network tags. This may result in reduced network overhead and network management expense as virtual local area networks may be created and dismantled on demand. Flexibility may be an additional benefit as virtual local area networks may be created with provisioning information drawn randomly from resource pools maintained on a server. When a dynamically provisioned virtual local area network is dismantled, the provisioning information used to create it is returned to its resource pools for future use. Security is yet another potential benefit as dynamic virtual local area networks use randomly generated configuration information that by its nature may not be vulnerable to guessing or determining through brute force trial and error. By contrast, the configuration information for traditional static virtual local area networks does not change and may eventually become known to a variety of parties.

The system embodies a server that draws provisioning information from resource pools and sends the information to an access device and a firewall device to establish the virtual local area network. Physical interfaces on each device support and may be associated with a limited quantity of the subnet interfaces. The association of a subnet interface and a virtual local area network tag with a physical interface on each device enables the establishment of the virtual local area network. This action may allow the virtual local area network to be joined by a client device that has requested access to network services.

The process of virtual local area network provisioning may be initiated by a client device requesting access to services on a network. When authenticating the client device and considering the network services requested by the client device, the server may determine that a policy currently in effect requires that the client device be associated with a virtual local area before being granted access to the requested services. When the server makes this determination and authenticates the client device, a virtual local area network may be provisioned by the server to handle traffic associated with the client device's accessing of the requested network services.

In an embodiment, the server may draw upon separate pools of configuration resources necessary to provision the virtual local area network determined to be required by the server when authenticating the client device. The pools comprise virtual local area network names or tags, subnet interface configuration information, and policies related to client devices, users, groups, and/or resources. One or more policies may require a client device to be associated with a virtual local area network. The server randomly draws virtual local area network or tags and subnet information from their respective pools and sends this information along with the policy and physical interface designation to the access and firewall devices for association with the physical port designated on each device. The association of the new subnet interface, tag, and policy with the physical interface or port on each device establishes the virtual local area network. The server at approximately the same time associates the client device with the virtual local area network. The client device may then begin accessing the desired network services.

In an embodiment, a client device may be unaware that a virtual local area network is being provisioned and established on behalf of the client device to provide it access to the network services it is requesting. For some users, groups, client devices, and/or network services or combination thereof, association with a virtual local area network may not be necessary at all. Access to network services is usually the client device's primary objective and any association with a virtual local area network enforced by the server to provide this access may not be apparent or of interest to the client device. When performing authentication of client devices, the server reviews policies associated with users, groups, client devices, and network services associated with the request received from the client device. The server makes a determination whether association with a virtual local area network will be necessary to grant the requested access and if the association will be to a dynamically created virtual local area network as described above or to a specific virtual local area network designated for a particular purpose.

In some embodiments, a client device upon authentication will be associated with a dynamically created and newly established and exclusive virtual local area network for that client device's sole use. That exclusive virtual local area network may then be terminated and dismantled when the client device ends its session. Regarding specific virtual local area networks designated for particular purposes, in some cases, specific subnet interface information and virtual local area network tags may be reserved for certain groups of client devices that must always be joined together using the same virtual local area network tag. Client devices that are members of these groups may have credentials or be associated with policies that are recognized by the server and provided the subnet interface information and virtual local area network tag associated with the group's virtual local area network.

In an embodiment, the server also has the functionality to recover subnet interface information and virtual local area network tags that were previously used in provisioning a virtual local area network but have become available as the client device associated with the virtual local area network has terminated its session. After a delay, the server returns the recovered subnet information and virtual local area network tags to their respective pools for future reuse.

Turning now to FIG. 1, a system 100 for dynamic firewall and dynamic host configuration protocol configuration is described. The system 100 comprises an authentication/authorization application server 102, an authentication/authorization application 110, a configuration database 120, an access device 130, a firewall device 140, a first client device 150, a wireless base station 180, a network 190, and an Internet 192. Embodiments of the system 100 typically comprise an indefinite number of additional client devices 160 and 170. Embodiments of the system also typically comprise additional wireless base stations 182. Interactions of the first client device 150 and the additional client devices 160 and 170 either singly or collectively may be represented henceforth as the client device 150.

The authentication/authorization server 102 may be any general purpose computer system, as discussed in greater detail hereinafter. The authentication/authorization server 102 may comprise one computer or a plurality of computers, for example a server farm wherein many server computers cooperate to share a processing load. The authentication/authorization server 102 may comprise a plurality of computers that are located at different places, for example to provide geographical diversity and increased service reliability. The authentication/authorization server 102 executes one or more applications that provide services to at least one of the client devices 150 including hosting of the authentication/authorization application 110.

The authentication/authorization application 110 executes on the authentication/authorization server 102 and receives messages from the access device 130 containing requests from the client device 150 for authentication and access to network services. The authentication/authorization application 110 comprises a communication component 112 that communicates with the access device 130, the firewall device 140, and other devices as needed. The communication component 112 receives authentication requests from the access device 130 generated by the client device 150 accessing network services. The communication component 130 also sends configuration information and associated instructions to the access device 130 and the firewall device 140 when a virtual local area network is to be provisioned. The communication component 112 also engages in other communication with the access device 130 and the firewall device 140 about the maintenance and tear down of the virtual local area network and the recovery of virtual local area network tags and subnet interface configuration information after tear down. The authentication/authorization application 110 also comprises the authenticator component 114 that authenticates client devices 150 seeking to access network services. The authenticator component 114 receives the request for authentication from the access device 130 on behalf of the client device 150. The authenticator component 114 examines the authentication request and determines if a policy is currently in place for the client device 150, a user or group associated with the client device 150, the network services requested, a combination thereof, or any other aspect of the request. If such a policy is in place, the authenticator component 114 reviews the policy and makes a determination whether the policy requires that the client device 150 should be associated with a virtual local area network. In the event such a policy is in place and authenticator component 114 determines that the client device 150 should be associated with a virtual local area network, the authenticator component 114 may then complete the steps of port-based authentication as described in standard 802.1x issued by the Institute of Electrical and Electronics Engineers (IEEE). Port-based authentication may be a necessary step toward associating the client device 150 with a virtual local area network. After the authenticator component 114 completes port-based authentication of the client device 150, if necessary, and any other steps required to authenticate the client device 150 for access to services, it may contact the communication component 112 with the request to generate configuration information in accordance with the policy found and provision the virtual local area network for the client device 150.

The authentication/authorization application 110 also comprises the resource pool access component 116 that performs interaction with the configuration database 120 to obtain configuration and policies information to provision virtual local area networks and take delivery of recovered configuration information after virtual local area networks have been torn down. The resource pool access component 116 is called upon by the authenticator component 114 to locate applicable policies when the client device 150 is seeking to be authenticated. The resource pool access component 116 is also called upon by the configuration component 112 after the client device 150 has been authenticated to draw subnet interface information and virtual local area network tag information from the configuration database 120 for the purpose of provisioning the virtual local area network needed to provide the client device 150 access to the requested network services. The authentication/authorization application 110 may alternatively be referred to as the dynamic network interfaces application.

The configuration database 120 is associated with the authentication/authorization server 102 and is the repository of configuration and other information provided to the access device 130 and the firewall device 140 to configure interfaces and enable the provisioning of virtual local area networks. The configuration database 120 comprises the subnet interface pool 122 that holds the information needed to configure the subnet interfaces on the access device 130 and the firewall device 140 to provision the virtual local area network for the client device 150. Information associated with configuring a subnet interface comprises an internet protocol address, an Internet protocol subnet mask, an internet protocol default gateway, a domain name system (DNS) server, and a dynamic host configuration protocol (DHCP) server.

In embodiments, the subnet interface pool 122 may comprise sub-pools that each contain a quantity of the specific individual elements or combinations of the individual elements described above that together allow subnet interfaces to be configured on the access device 130 and the firewall device 140. The configuration database 120 also comprises the tag pool 124 that is a collection of names, numbers, or other designations provided to virtual local area networks when they are provisioned. Virtual local area network tags may alternatively be referred to as 802.1Q tags. The numbering system and sequence of selection of tags from the tag pool 124 may be subject to guidelines defined by the authentication/authorization application 110. Alternatively, the assignment of numbers or names to tags may be random. Individual tags may be set aside and reserved or preconfigured for use by groups with reserved subnet interface information. The configuration database 120 also comprises a policies pool 126. Policies are guidelines associated with client devices 150, users, groups, and/or available network services. As accessing services may involve contacting resources outside of an enterprise network and hence call for accessing network ports on a firewall device 140, policies also may be associated with the firewall device 140. Policies may outline the types of traffic allowed in and out of a network. The authenticator component 114, in developing a response to a request from the client device 150 for access to network services, may be required to adhere to a policy found in the policies pool 126 associated with the firewall device 140 in addition to any policies found that regard the client device 150, users, and/or groups. The authentication/authorization application 110 may be bound by a policy regarding some aspect of a request originated by the client device 150 or a more general directive applying to some or all virtual local area network configurations.

The access device 130 receives the initial request to access network services from the client device 150 and furnishes the request to the authenticator component 114 of the authentication/authorization application 110 for authentication. The access device 130 comprises the messaging component 132 that handles communication between the access device 130 and the other components of the system 100 including the client device 150 and the authentication/authorization server 102. The messaging component 132 receives the request from the client device 150 and sends its message to the authentication/authorization application 110 requesting the authenticator component 114 to authenticate the client device 150. In the event the client device 150 must be associated with a virtual local area network to provide the client device 150 access to the desired network services, the messaging component 132 also receives the reply from the authentication/authorization server 102 containing the information needed to configure the necessary subnet interface. The messaging component 132 has the functionality to read, process, and reply to messages sent by the authentication/authorization server 102 and the client device 150.

The access device 130 also comprises the access device configuration component 134 that uses the configuration information received from the authentication/authorization server 102 to configure the necessary interface on the access device 130. The access device configuration component 134 receives the Internet protocol address, subnet mask, and other information needed to configure the new subnet interface on the access device 130, configures the subnet interface, and associates the subnet interface with the virtual local area network tag and physical interface designation also received from the authentication/authorization server 102. The access device configuration component 134 also contains functionality to understand and carry out instructions received in the transmission from the authentication/authorization server 102 that accompany the requested configuration information. The instructions may call for the interface to be configured in accordance with a policy drawn by the resource pool access component 116 from the policies pool 126 when the authentication/authorization application 110 was fulfilling the request received from the access device 130.

When a client device 130 ends its session, thus causing the associated virtual local area network session to terminate, the access device 130 may notify the authentication/authorization application 110. The authentication/authorization application 110 controls the process of virtual local area network teardown which may include directing the access device 130 and the firewall device 140 to shut down the subnet interfaces dedicated to the virtual local area network being terminated. The authentication/authorization application 110 also releases the internet protocol configuration information used to configure the subnet interface and the associated virtual local area network tag. The released subnet configuration information and virtual local area network tag after a short delay are returned to their respective pools in the configuration database 120 and are made available for future reuse.

The access device 130 may be a single physical device or more than one physical device that have similar functionality and perform substantially the same tasks in connection with the system 100. The access device 130 may be an Ethernet switch, WiFi access point, edge switch, other wireless access point, or other device with the capability to control physical access to a network based on the authentication status of the client device 150. In an embodiment, the system 100 may comprise more than one access device 130.

The firewall device 140 provides connection to the internet 192 for devices on the network 190 through a secure network port or ports on the firewall device 140. The firewall device 140 may be a dedicated physical device or functionality resident on another device that inspects and regulates traffic flowing through its ports. The firewall device 140 may comprise at least one of a router, a network gateway device, other device, or combination of these devices. The firewall device 140 is the component of the system 100 through which the client device 150 using a virtual local area network makes contact with resources on the Internet 192. A subnet interface is configured and associated with a physical interface on the firewall device 140 to provision the virtual local area network per the request of the client device 150. The firewall device 140 also may concurrently provide access to the Internet 192 to other devices on the network 190 unrelated to the client device 150 and unrelated to security levels and network traffic in connection with a virtual local area network provisioned for the client device 150. The firewall device 140 also may concurrently provide access to the Internet 192 to devices that are not components of the system 100. The firewall device 140 has functionality to segregate network traffic intended for the client device 150 on a virtual local area network from other traffic originating from the Internet 192 or elsewhere.

The firewall device 140 comprises the firewall configuration component 142 that receives configuration information from the authentication/authorization server 102. The firewall device 140 configures a subnet interface using the configuration information and associates the subnet interface with a physical interface on the firewall device 140 to enable the provisioning of a virtual local area network. Similar to the access device 130, the firewall device 140 configures a subnet interface using the subnet interface information, virtual local area network tag, and policy received from the authentication/authorization server 102 and associates the subnet interface with a physical interface on the firewall device 140. The firewall configuration component 142 receives the configuration information from the authentication/authorization server 102 as a result of the authentication/authorization server 102 authenticating a request from the client device 150 for access to network services. The subnet interface information received comprises the Internet protocol address, subnet mask, and other information needed to configure the subnet interface on the firewall device 140 dedicated to the virtual local area network. The firewall configuration component 142 configures the subnet interface and associates the subnet interface with the virtual local area network tag, policy, and physical port designation also received from the authentication/authorization server 102. The firewall configuration component 142 contains functionality to receive, read, understand, and carry out instructions from the authentication/authorization server 102 in connection with configuration information sent by the authentication/authorization server 102 to configure a subnet interface and associate it with a physical interface on the firewall device 140. The instructions may be in connection with a policy associated with the particular client device 150 involved with the newly provisioned virtual local area network or a level of security required for the virtual local area network. In an embodiment, the instructions may also be in connection with a group or community of interest of which the client device 150 is a member. In the embodiment, the subnet interface information and virtual local area network tag are dedicated to the client device 150 and group.

The client device 150 is the component that seeks to access network services and contacts the access device 130 to begin the process. The client device 150 may be one of a mobile telephone, personal digital assistant (PDA), laptop computer, tablet computer, desktop computer, set-top box, Voice over Internet Protocol (VoIP) desk set, printer, data appliance, camera, webcam, femtocell, and video device enabled to use the Internet Protocol (IP). The client device 150 may be any device capable of using the Ethernet networking technology. The client devices 150, 160, 170 comprise a supplicant component 152, 162, 172 that makes initial contact with the access device 130 to initiate the process of authentication toward being granted access to network services. The client device 150, 160, 170 also comprises a messaging component 154, 164, 174 that conducts messaging with the other components of the system 100 after the client device 150, 160, 170 has been authenticated by the authentication/authorization application 110.

The wireless base stations 180 and 182 may be any of a mobile telephone wireless base station, for example a Code Division Multiple Access (CDMA), Global System for Mobile Communications (GSM), and/or Universal Mobile Communications System (UMTS) mobile telephone wireless base station; a World-wide Interoperable Microwave Access (WiMAX) base station; a WiFi access point; or other wireless access device.

The network 190 promotes communication between the components of the system 100. The network 190 may be any communication network including a public data network (PDN), a public switched telephone network (PSTN), a private network, and/or a combination thereof.

The Internet 192 is a worldwide, publicly accessible series of interconnected computer networks that transmit data by packet switching using the standard internet protocol (1P). In an embodiment, the Internet 192 may be any network external to the network 190 to which the client device 150 wishes to connect its virtual local area network.

Figure 2:
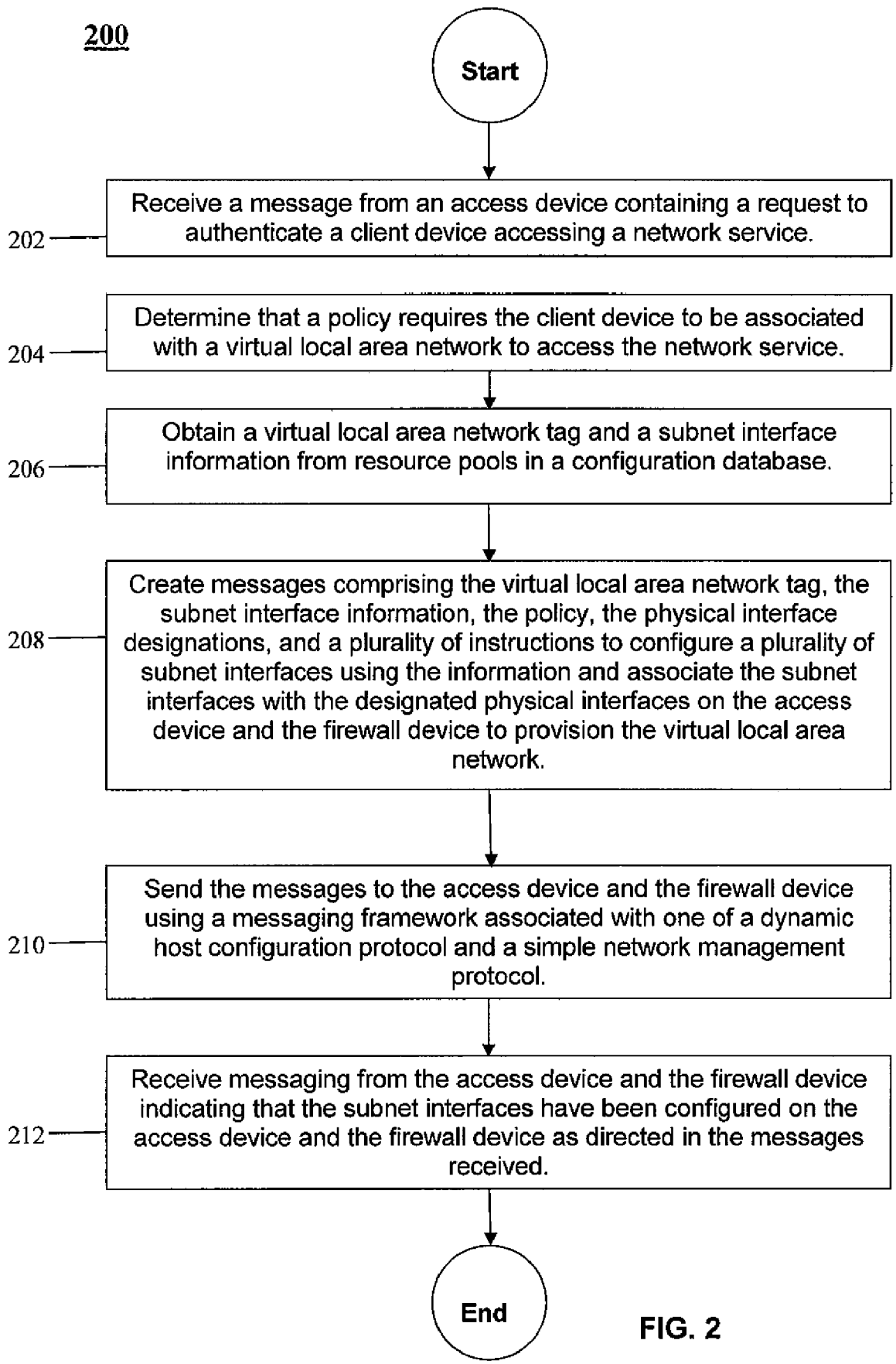
FIG. 2 is a flow chart illustrating a method according to an embodiment of the disclosure.

Turning now to FIG. 2, a method 200 of dynamically provisioning a virtual local area network is provided. Beginning at block 202, the authenticator component 114 of the authentication/authorization application 110 receives a request from the messaging component 132 of the access device 130. The message contains a request to authenticate the client device 150 that is seeking access to network services. The request from the access device 130 to the authentication/authorization application 110 for authentication of the client device 150 may constitute all or a portion of the information contained in the request from the client device 150 to the access device 130 passed through in its original format.

At block 202, the authenticator component 114 directs the resource pool access component 116 to access policies from the policies pool 126 connected to the request originated by the client device 150. The authenticator component 114 seeks to determine if one or more policies are currently in place regarding the client device 150, a user or group associated with the client device 150, the services requested, any combination thereof, or any other aspect of the request received from the client device 150 that might require the client device 150 to be associated with a virtual local area network before the client device 150 may be granted access to the requested network services.

At block 204, the authenticator component 114 determines that a policy does in fact require that the client device 150 be associated with a virtual local area network to provide it access to the requested network services. At block 206, the resource pool access component 116 of the authentication/authorization application 110 obtains subnet interface information and a virtual local area network tag from the subnet interface pool 122 and the tag pool 124, respectively. This information, along with the policy and a physical interface designation, is to be sent to the access device 130 and the firewall device 140 for each device to configure subnet interfaces and associate the subnet interfaces with the physical interfaces on each device.

In an embodiment, there is no relationship between the subnet interface information drawn from the subnet interface pool 122 and the virtual local area network tag drawn from the tag pool 124. This information may be combined randomly and in the embodiment there may be benefit to the system 100 in doing so. Dynamically generating and randomly combining subnet interface identifications and virtual local area network tags reduces some of the risks associated with virtual local area network identifications being permanently established and well known to many or all devices across a network.

At block 208, the communication component 112 of the authentication/authorization application 110 creates messages for the access device 130 and the firewall device 140 containing the subnet interface information, virtual local area network tag, policy, and the physical port to be used by those devices in configuring the needed virtual local area network. The messages also may contain specific instructions to the access device 130 and the firewall device 140 to configure the subnet interfaces on the devices to provision the virtual local area network. The instructions may be related to the policy found in the policies pool 126 related to the client device 150 or network services requested by the client device 150. The messages may be sent using the messaging framework of the dynamic host configuration protocol (DHCP), simple network management protocol (SNMP), or other protocol.

At block 210, the authentication/authorization application 110 sends the messages to the access device 130 and the firewall device 140 with the instructions to configure their interfaces with the subnet interface information and the accompanying virtual local area network tag and physical port designation. The access device configuration component 134 on the access device 130 and the firewall configuration component 142 on the firewall device 140 take delivery of the information contained in the messages, configure subnet interfaces pursuant to instructions received, and associate the interfaces with the virtual local area network tag and physical interface on each device also specified in the message. At block 210, the subnet interfaces are provisioned on the access device 130 and the firewall device 140.

At block 212, the authentication/authorization application 110 receives messages from the access device 130 and the firewall device 140 indicating that interfaces have been configured on each device and associated with the virtual local area network tag and physical interface specified in the message. The authentication/authorization application 110 activates the virtual local area network and may send messaging that the services requested by the client device 150 may be accessed.

When a virtual local area network terminates, the subnet interfaces on the access device 130 and the firewall device 140 are deleted and the subnet information and virtual local area network tag associated with the virtual local area network are no longer in use. The access device configuration component 134 provides notice to the communication component 112 of the authentication/authorization application 110 that the client device 150 has terminated its connection. The authentication/authorization application 110 provides instructions to the access device 130 and firewall device 140 to terminate their subnet interfaces associated with the terminated virtual local area network. The resource pool access component 116 may then restore the released subnet interface information and virtual local area network tag to their respective pools for later reuse. In an embodiment, the subnet interface information and virtual local area network tag are not released immediately upon the client device 150, 160, 170 dropping its network connection. The subnet interface information and virtual local area network tag are placed in a temporary holding account for a brief period, for example one minute, in the event the client device 150 returns and is able to resume using the virtual local area network. Should the period of temporary holding expire and the client device 150 does not return, the subnet interface information and virtual local area network tag are placed in a second holding account for a longer period, for example for about an hour or several hours, wherein that information cannot be used for security reasons. At the expiry of the longer period, the subnet interface information and virtual local area network tag are finally returned their respective pools for reuse.

Figure 3:
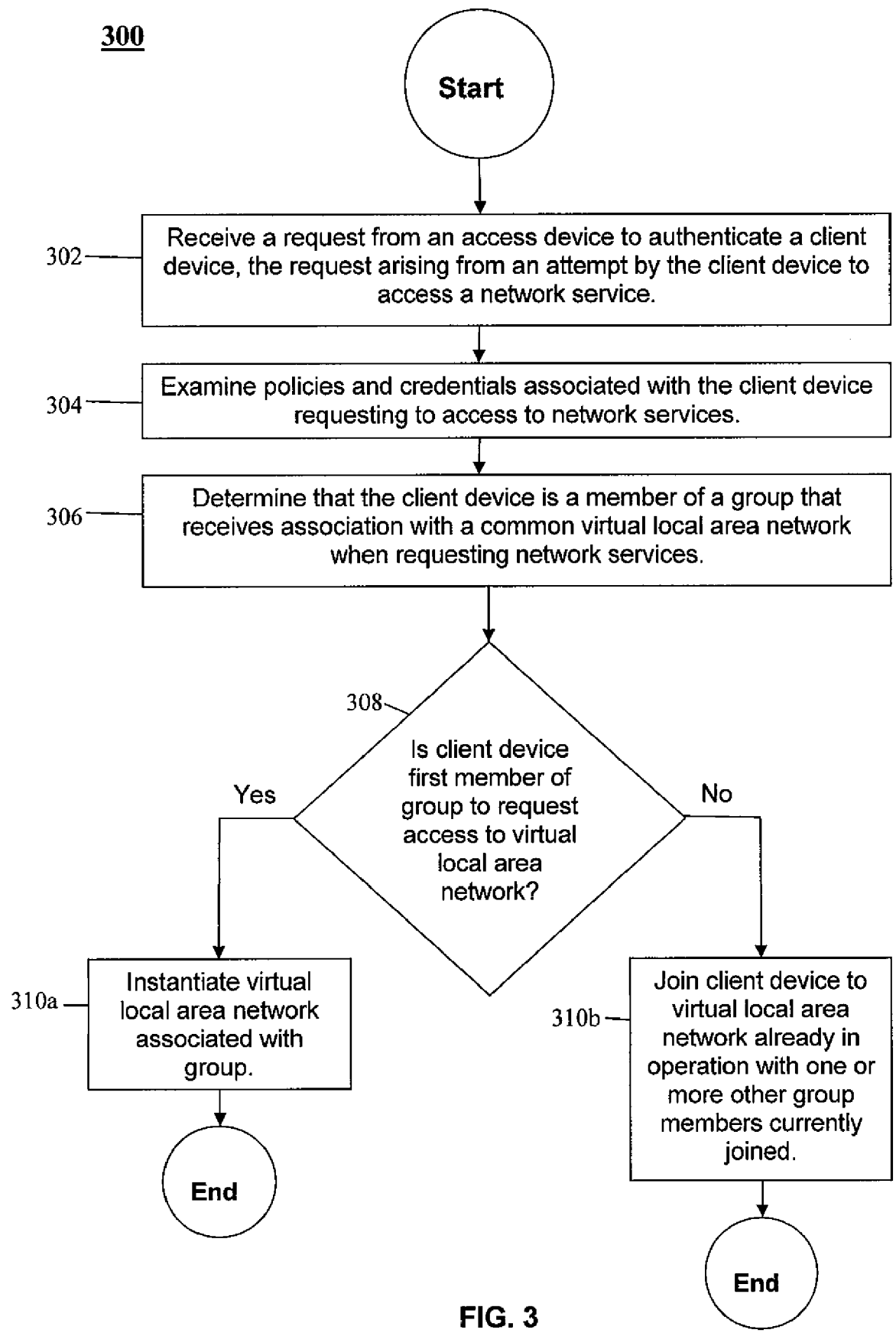
FIG. 3 is a flow chart illustrating another method according to an embodiment of the disclosure.

Turning now to FIG. 3, another method 300 of dynamically provisioning a virtual local area network is provided. In an embodiment, a client device 150 may be a member of a group or community of interest wherein members require access to the same network services. Providing members of a group access to one or more network services that do not often change may be accomplished by creating a policy that associates each member of the group with the same virtual local area network tag each time one or more members of the group requests those specific network services. For example, members of a disaster recovery team or emergency preparedness task force may desire to be placed in the same group regardless of where they are and how they approach the access device 130. Dynamically drawing subnet interface information and randomly combining the information with a dynamically drawn virtual local area network tag as in other embodiments is effective so long as each client device 150 identified as a member of a certain group is provided the same virtual local area network tag, associated subnet interface designation on the access device 130 and the firewall device, and physical port designation as every other client device 150 identified as a member of that group when they seek to access the network services specific to the group. Associating all members of a group with the same tag allows all of them to be joined together and provided the same network services each time.

Beginning at block 302, the authentication/authorization application 110 receives a request from the access device 130 to on behalf of a client device 150 to authenticate the client device 150 and provide it access to specific network services. At block 304, the authentication/authorization application 110 in authenticating the client device 150 examines credentials or other identifying or qualifying information provided by the client device 150 and any policies associated with the client device 150 and or network services requested. At block 306, the authentication/authorization application 110 determines that the client device 150 is a member of a group wherein all members of the group who attempt to access one or more specific network services are to be assigned the same virtual local area network tag, subnet interface configuration, and physical port designation on the access device 130 and firewall device 140.

At block 308, the authentication/authorization application 110 determines if the client device 150 seeking access to the specific network services is the first member of the group to seek access. If the client device 150 is the first member of the group to seek access, the authentication/authorization application 110 at block 310a draws subnet configuration information and a virtual local area network tag from its resource pools and furnishes the information along with the policy and physical interface information to the access device 130 and firewall device 140 for their configuring of interfaces and provisioning of the virtual local area network for the client device 150. The provisioning information may be sent using the messaging framework of the dynamic host configuration protocol (DHCP), simple network management protocol (SNMP), or other protocol. Should client devices 160 and 170 that are also members of the group later seek to access the same network services while the client device 150 is still engaged in its session, they will be assigned the same virtual local area network tag as the client device 150 and joined into the active session with the client device 150.

If the authentication/authorization application 110 at block 308 determines that the client device 150 is not the first member of the group to request access to the specific network services, this means that a virtual local area network specifically tagged for members of the group is currently in effect and one or more other client devices 160, 170 is currently connected and accessing the specific network services. In this event, the authentication/authorization application 110 at block 310b joins the newly authenticated client device 150 to the virtual local area network currently tagged and in effect for the group. The client device 150 may then begin interaction with other members of the group previously joined to the virtual local area network. In an embodiment, client devices 150, 160, 170 may join the same virtual local area network but be using different access devices 130 and firewall devices 140. When client devices 150, 160, 170 are joining the same virtual local area network but using different access devices 130 and firewall devices 140 because of their location or other reason, the authentication/authorization application 110 in joining these client devices 150, 160, 170 to the virtual local area network may need to provision subnet interfaces on the additional access devices 130 and firewall devices 140 to enable these client devices 150, 160, 170 to be joined. When the last member of the group drops its connection to the virtual local area network, the specifically tagged virtual local area network for that group is terminated by the authentication/authorization application 110.

In some embodiments of the method 300, a specific virtual local area network may be permanently reserved for members of a group and that specific tag will remain reserved and designated for the group even when no members of the group are in a session and accessing the specific network services. In other embodiments of the method 300, a specific virtual local area network tag is not permanently reserved for members of the group. In this case, functionality within the authentication/authorization application 110 causes it to randomly draw a virtual local area network tag from the policies pool 126 when the first client device 150 that is a member of the group authenticates and assign all subsequent authenticating client devices 160, 170 that are members of the group the same virtual local area network tag. The virtual local area network with its specific tag for that session remains in effect until the last member of the group drops its connection whereupon the tag and subnet interface information are shortly returned to their respective pools for reuse as previously described.

In an embodiment, client devices 150, 160, 170 that are members of a group may reach the access device 130 from a variety of network types including one of a code division multiple access evolution-data optimized (CDMA EV-DO), code division multiple access round-trip time (CDMS RTT), Institute of Electrical and Electronics Engineers 802.1Q, Worldwide Interoperability for Microwave Access (WiMAX), digital subscriber line (DSL), and global system for mobile communications high-speed downlink packet access network (GSM HSDPA).

Figure 4:
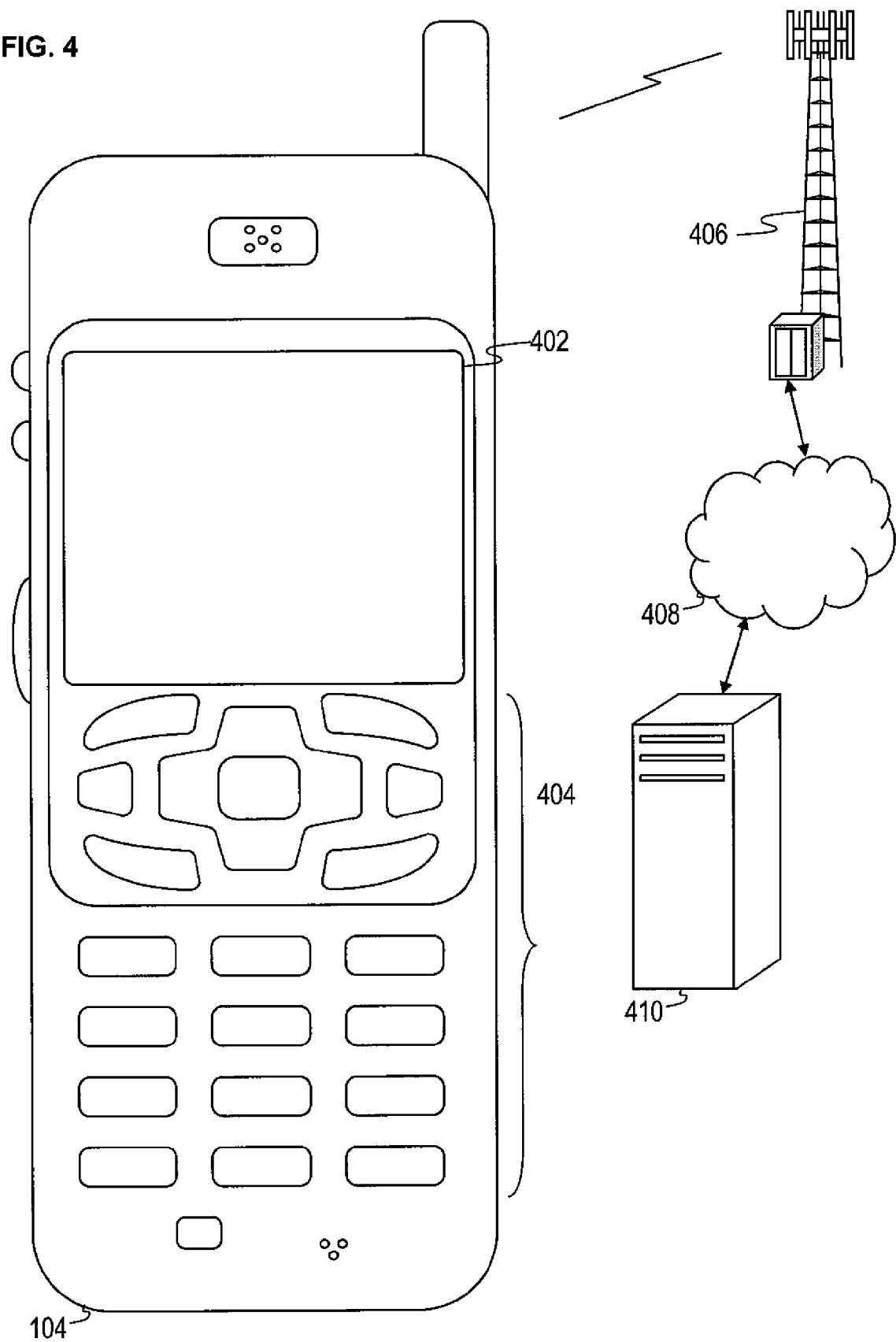
FIG. 4 is an illustration of a mobile device according to an embodiment of the disclosure.

FIG. 4 shows a wireless communications system including the handset 104. FIG. 4 depicts the handset 104, which is operable for implementing aspects of the present disclosure, but the present disclosure should not be limited to these implementations. Though illustrated as a mobile phone, the handset 104 may take various forms including a wireless handset, a pager, a personal digital assistant (PDA), a portable computer, a tablet computer, or a laptop computer. Many suitable handsets combine some or all of these functions. In some embodiments of the present disclosure, the handset 104 is not a general purpose computing device like a portable, laptop or tablet computer, but rather is a special-purpose communications device such as a mobile phone, wireless handset, pager, or PDA. The handset 104 may support specialized activities such as gaming, inventory control, job control, and/or task management functions, and so on.

The handset 104 includes a display 402 and a touch-sensitive surface or keys 404 for input by a user. The handset 104 may present options for the user to select, controls for the user to actuate, and/or cursors or other indicators for the user to direct. The handset 104 may further accept data entry from the user, including numbers to dial or various parameter values for configuring the operation of the handset. The handset 104 may further execute one or more software or firmware applications in response to user commands. These applications may configure the handset 104 to perform various customized functions in response to user interaction. Additionally, the handset 104 may be programmed and/or configured over-the-air, for example from a wireless base station, a wireless access point, or a peer handset 104.

The handset 104 may execute a web browser application which enables the display 402 to show a web page. The web page may be obtained via wireless communications with a cell tower 406, a wireless network access node, a peer handset 104 or any other wireless communication network or system. The cell tower 406 (or wireless network access node) is coupled to a wired network 408, such as the Internet. Via the wireless link and the wired network, the handset 104 has access to information on various servers, such as a server 410. The server 410 may provide content that may be shown on the display 402. Alternately, the handset 104 may access the cell tower 406 through a peer handset 104 acting as an intermediary, in a relay type or hop type of connection.

FIG. 5 shows a block diagram of the handset 104. While a variety of known components of handsets 102 are depicted, in an embodiment a subset of the listed components and/or additional components not listed may be included in the handset 104. The handset 104 includes a digital signal processor (DSP) 502 and a memory 504. As shown, the handset 104 may further include an antenna and front end unit 506, a radio frequency (RE) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 104 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 104 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 104 to send and receive information from a cellular network or some other available wireless communications network or from a peer handset 104. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 104 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 104 to function as a peripheral device to exchange information with a personal computer or other computer system. The infrared port 524 and other optional ports such as a Bluetooth interface or an IEEE 802.11 compliant wireless interface may enable the handset 104 to communicate wirelessly with other nearby handsets and/or wireless base stations.

The input/output interface 518 may further connect the DSP 502 to the vibrator 526 that, when triggered, causes the handset 104 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 104. Another input mechanism may be the touch screen LCD 530, which may also display text and/or graphics to the user. The touch screen LCD controller 532 couples the DSP 502 to the touch screen LCD 530.

The CCD camera 534 enables the handset 104 to take digital pictures. The DSP 502 communicates with the CCD camera 534 via the camera controller 536. The GPS sensor 538 is coupled to the DSP 502 to decode global positioning system signals, thereby enabling the handset 104 to determine its position. In another embodiment, a camera operating according to a technology other than charge coupled device cameras may be employed. Various other peripherals may also be included to provide additional functions, e.g., radio and television reception.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 104. Also shown in FIG. 6 are a web browser application 608, a media player application 610, and JAVA applets 612. The web browser application 608 configures the handset 104 to operate as a web browser, allowing a user to enter information into forms and select links to retrieve and view web pages. The media player application 610 configures the handset 104 to retrieve and play audio or audiovisual media. The JAVA applets 612 configure the handset 104 to provide games, utilities, and other functionality. The messaging component 614 corresponds to the messaging component 154, 164, 174 described in the system 100.

Figure 7:
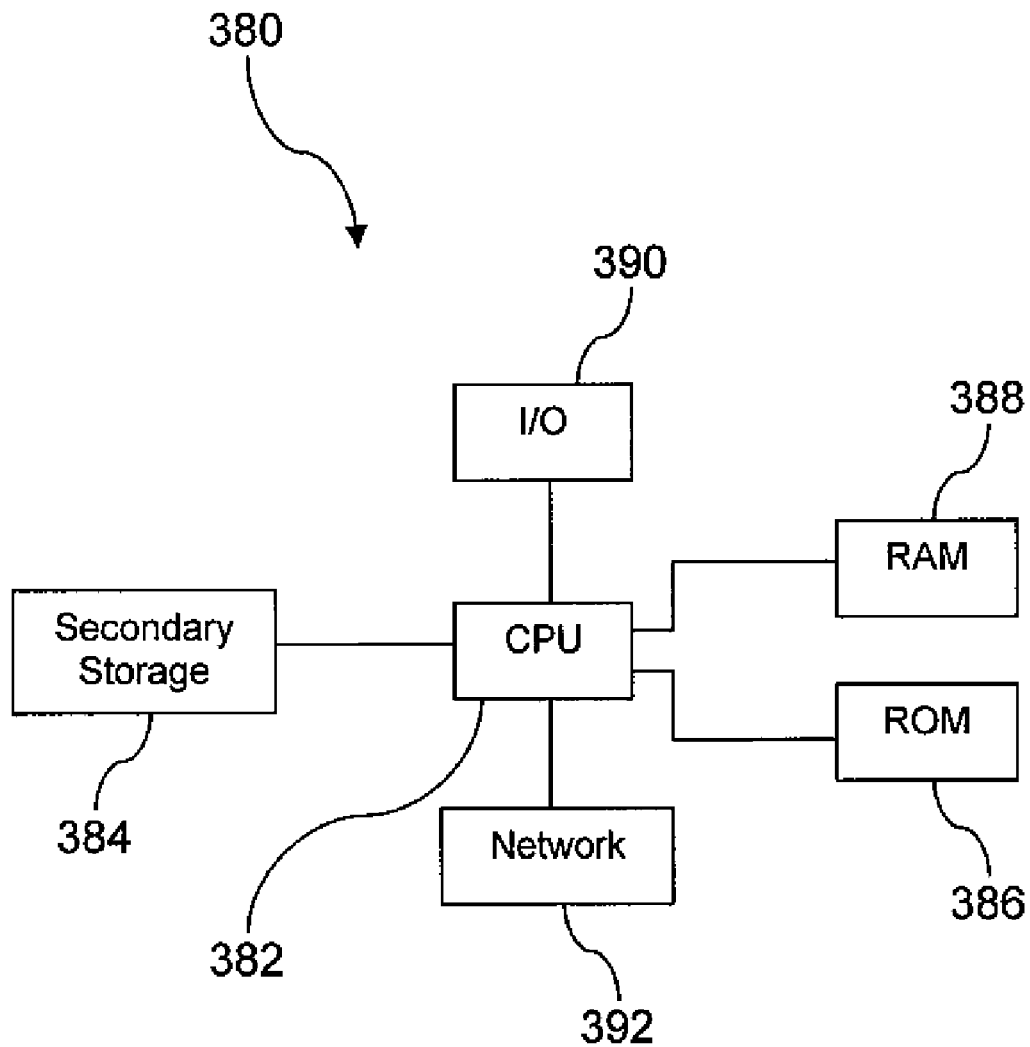
FIG. 7 is an illustration of a general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 380 includes a processor 382 (which may by referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 392 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A dynamic network interfaces system, comprising:
    an at least one computer system;
    a configuration database comprising a subnet interface pool and a virtual local area network tag pool; and
    a dynamic network interfaces application that, when executed on the at least one computer system,
        receives a message from a network access component containing a request to authenticate a client device accessing a network service,
        determines that a policy requires the client device to be associated with a virtual local area network to access the network service,
        authenticates the client device for association with the virtual local area network,
        obtains subnet interface information from the subnet interface pool and a virtual local area network tag from the virtual local area network tag pool to provision the virtual local area network, wherein the virtual local area network tag is unrelated to and randomly combined with the subnet interface information,
        assigns the subnet interface information from the subnet interface pool and the virtual local area network tag from the virtual local area network tag pool to the client device, the network access component, and a firewall component,
        sends a reply containing the subnet interface information from the subnet interface pool and the virtual local area network tag from the virtual local area network tag pool to the network access component and the firewall component in response to the request, wherein the reply further includes instructions to the network access component and the firewall component to use the subnet interface information from the subnet interface pool and the virtual local area network tag from the virtual local area network tag pool to provision the virtual local area network, and
        activates the virtual local area network in response to receiving at least one message from the access device and the firewall device indicating that interfaces have been configured on each device and associated with the virtual local area network tag and a physical interface.

2. The system of claim 1, wherein the reply further includes instructions to configure a subnet interface on the network access component and the firewall component to provision the virtual local area network, the subnet interface to be associated with the physical interface on the network access component and the firewall component.

3. The system of claim 1, wherein the authentication of the client device for association with the virtual local area network uses the IEEE 802.1x framework for authentication.

4. The system of claim 1, wherein the subnet interface information from the subnet interface pool and the virtual local area network tag from the virtual local area network tag pool comprises at least one of information identifying the virtual local area network, a physical interface, and information to configure a subnet interface comprising at least one of an internet protocol address, a subnet mask, a default gateway, a domain name system server, and a dynamic host configuration protocol server.

5. The system of claim 1, wherein the dynamic network interfaces application sends the reply to the network access component and the firewall component using a messaging framework associated with one of a dynamic host configuration protocol and a simple network management protocol.

6. The system of claim 1, wherein the network access component and the firewall component are installed on computers separate from the computer system on which the dynamic network interfaces application executes.

7. The system of claim 1, wherein the network access component and the firewall component comprise components to install the subnet interface information from the subnet interface pool and the virtual local area network tag from the virtual local area network tag pool provisioning the virtual local area network.

8. The system of claim 1, wherein the dynamic network system interface further sends a message that the network service requested by the client device is accessible.

9. A method of dynamically provisioning a virtual local area network, comprising:
    receiving a message from an access device containing a request to authenticate a client device accessing a network service;
    determining that a policy requires the client device to be associated with a virtual local area network to access the network service;
    obtaining subnet interface information from a subnet interface pool and a virtual local area network tag from a virtual local area network tag pool in a configuration database, wherein the virtual local area network tag is unrelated to and randomly combined with the subnet interface information;
    creating messages comprising the subnet interface information from the subnet interface pool, the virtual local area network tag from the virtual local area network tag pool, the policy, physical interface designations, and a plurality of instructions to configure a subnet interface using the subnet interface information from the subnet interface pool and the virtual local area network tag from the virtual local area network tag pool and associate the subnet interface with the designated physical interfaces on the access device and the firewall device to provision the virtual local area network;

sending the messages to the access device and the firewall device using a messaging framework;

receiving messaging from the access device and the firewall device indicating that the subnet interface has been configured on the access device and the firewall device as directed in the messages received; and activating the virtual local area network in response to receiving the messages from the access device and the firewall device.

10. The method of claim 9, wherein the client device is one of a mobile telephone, personal digital assistant, laptop computer, tablet computer, desktop computer, set-top box, media player, Voice over Internet Protocol desk set, printer, data appliance, camera, webcam, and femtocell.

11. The method of claim 9, wherein the messaging framework is associated with one of a dynamic host configuration protocol and a simple network management protocol.

12. The method of claim 9, wherein policies are associated with firewall devices and client devices, and wherein the policies define at least one of client device access to service levels associated with network services and physical interfaces of firewall devices.

13. The method of claim 9, wherein the access device provides notice when the virtual local area network is terminating and the virtual local area network tag is returned to the virtual local area network tag pool and the subnet interface information is returned to the subnet interface pool and the virtual local area network tag and the subnet interface information are made available for future use.

14. The method of claim 13, wherein the virtual local area network tag is returned to the virtual local area network tag pool and the subnet interface information is returned to the subnet interface pool after a time delay.

15. A method of dynamically provisioning a virtual local area network, comprising:

receiving a message from an access device comprising a request to authenticate a client device accessing a network service;

determining that a policy requires the client device to be associated with a virtual local area network to access the network service;

determining that the client device is a member of a group wherein members of the group are associated with a single virtual local area network tag;

determining that the client device is one of the first member of the group to request access and one of the second and subsequent members of the group to request access to the network service and receive authentication;

when the client device is the first member of the croup to request access to the network service associated with the group, obtaining subnet interface information from a subnet interface pool and the virtual local area network tag from a virtual local area network tag pool, wherein the virtual local area network tag is unrelated to and randomly combined with the subnet interface information, sending to the access device and a firewall device the subnet interface information from the subnet interface pool, the virtual local area network tag from the virtual local area network tag pool, the policy, physical interface designations, and instructions to configure a subnet interface using the subnet interface information and the virtual local area network tag and associate the subnet interface with the designated physical interfaces on the access device and the firewall device to provision the virtual local area network, and activating the virtual local area network in response to receiving at least one message from the access device and the firewall device indicating that the subnet interface has been configured on each device and associated with the virtual local area network tag and the designated physical interfaces; and when the client device is one of the second and subsequent members of the group to request access to the network service associated with the group, joining the client device to the existing virtual local area network designated for the group.

16. The method of claim 15, wherein the subnet interface information and the virtual local area network tag designated for a group are randomly generated for the group when the first member of the group authenticates for network services associated with the group and wherein the subnet interface information and the virtual local area network tag are made available for reuse shortly after the last member of the group disconnects from the session.

17. The method of claim 16, wherein the virtual local area network tag designated for a group is reserved for the group when members of the group are one of currently engaged in a virtual local area network session associated with the group and not currently engaged in a virtual local area network session associated with the group.

18. The method of claim 15, wherein a client device that is a member of a group is joined to the virtual local area network associated with the group regardless of the type of access network used by the client device to reach the access device.

19. The method of claim 15, wherein the client devices using different access network types are joined on one virtual local area network.

20. The method of claim 19, wherein the client devices reach the access device from one of a code division multiple access evolution-data optimized, code division multiple access round-trip time, Institute of Electrical and Electronics Engineers 802.1Q, Worldwide Interoperability for Microwave Access, digital subscriber line, and global system for mobile communications high-speed downlink packet access network.

* * * * *